(12) United States Patent
Shah

(10) Patent No.: US 9,053,154 B1
(45) Date of Patent: Jun. 9, 2015

(54) SYSTEM AND METHOD FOR GENERATING A COMPATIBILITY SCORE FOR WEB CONTENT

(71) Applicant: Google Inc., Mountain View, CA (US)

(72) Inventor: Tejas Arvindkumar Shah, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 13/623,831

(22) Filed: Sep. 20, 2012

(51) Int. Cl.
*G06F 17/30* (2006.01)

(52) U.S. Cl.
CPC .................................. *G06F 17/3053* (2013.01)

(58) Field of Classification Search
CPC ....................... G06F 17/30899; G06F 17/3053
USPC ................................................. 707/748, 758
See application file for complete search history.

(56) References Cited

U.S. PATENT DOCUMENTS

| | | | |
|---|---|---|---|
| 7,505,969 B2 * | 3/2009 | Musgrove et al. ..... | 707/999.005 |
| 8,595,235 B1 * | 11/2013 | Sampson et al. ............. | 707/737 |
| 2004/0003248 A1 * | 1/2004 | Arkhipov ...................... | 713/170 |
| 2007/0239701 A1 * | 10/2007 | Blackman et al. ................ | 707/5 |
| 2008/0256046 A1 * | 10/2008 | Blackman et al. ................ | 707/3 |
| 2010/0195131 A1 * | 8/2010 | Nakata .......................... | 358/1.13 |
| 2011/0093773 A1 * | 4/2011 | Yee .............................. | 715/235 |
| 2011/0167360 A1 * | 7/2011 | Aitken et al. ................ | 715/760 |
| 2012/0023566 A1 * | 1/2012 | Waterson et al. ................. | 726/9 |
| 2012/0259919 A1 * | 10/2012 | Yan et al. ...................... | 709/204 |
| 2013/0139077 A1 * | 5/2013 | Kreichman et al. .......... | 715/764 |

OTHER PUBLICATIONS

Arbon, et al., "How We Tested Google Instant pp.," Jul. 27, 2011, <googletesting.blogspot.com/2011/07/how-we-tested-google-instant-pages.html>.
Bustamante, "Unleash the Quality Bots,", Oct. 6, 2011, <google-opensource.blogspot.com/2011/10/unleash-qualitybots.html>.
"Starting a Test Run," Oct. 4, 2011, <https://code.google.com/p/qualitybots/wiki/StartingATestRun>, 1 page.
"Quality Bots Design", Oct. 4, 2011, <https://code.google.com/p/qualitybots/wiki/QualityBotsDesign>, 3 pages.
"Set Up AMI," Oct. 4, 2011, <https://code.google.com/p/qualitybots/wiki/SetUpAMI>, 2 pages.
"Building and Deploying," Sep. 29, 2011, <https://code.google.com/p/qualitybots/wiki/BuildingAndDeploying>, 2 pages.

* cited by examiner

*Primary Examiner* — Phong Nguyen
(74) *Attorney, Agent, or Firm* — McDermott Will & Emery LLP

(57) ABSTRACT

A system and method for generating a compatibility score are provided. Elements associated with a web content as rendered by a benchmark browser engine are received. Elements associated with the web content as rendered by the test browser engine are received. The elements of the web content as rendered by the test browser engine are compared with corresponding elements of the web content as rendered by the benchmark browser engine. A compatibility for the web content is generated based on differences from the comparison between the elements of the web content as rendered by the benchmark browser engine and the elements of the web content as rendered by the test browser engine.

21 Claims, 6 Drawing Sheets

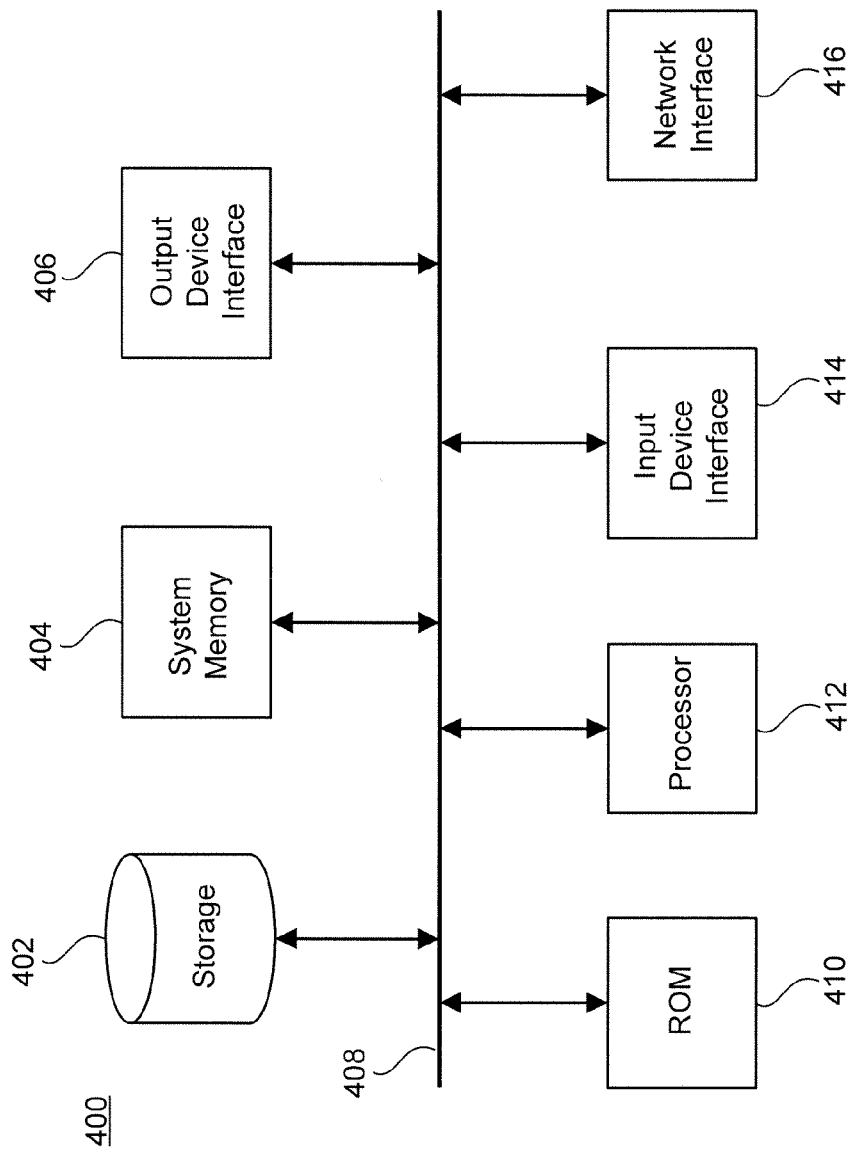

SYSTEM AND METHOD FOR GENERATING A COMPATIBILITY SCORE FOR WEB CONTENT

FIELD

The subject technology generally relates to generating a compatibility score, and in particular, relates to generating a compatibility score for web content.

BACKGROUND

Website developers can aspire to design websites that are compatible when rendered by different browser engines. While it is possible to manually conduct a side-by-side comparison of a website's layout as rendered by two browser engines, this process is labor intensive, inefficient, and error prone.

SUMMARY

The disclosed subject technology relates to a computer-implemented method for generating a compatibility score for web content. The method comprises receiving, from a benchmark browser engine, elements associated with a web content as rendered by the benchmark browser engine. The method further comprises receiving, from a test browser engine, elements associated with the web content as rendered by the test browser engine. The method further comprises comparing the elements of the web content as rendered by the benchmark browser engine with corresponding elements of the web content as rendered by the test browser engine. The method further comprises generating a compatibility score for the web content based on differences from the comparison between the elements of the web content as rendered by the benchmark browser engine and the elements of the web content as rendered by the test browser engine.

The disclosed subject matter further relates to a system for generating a compatibility score for web content. The system comprises one or more processors, and a machine-readable medium comprising instructions stored therein, which when executed by the processors, cause the processors to perform operations comprising receiving, from a benchmark browser engine, elements associated with a web content as rendered by the benchmark browser engine. The operations further comprise receiving, from a test browser engine, elements associated with the web content as rendered by the test browser engine. The operations further comprise comparing the elements of the web content as rendered by the benchmark browser engine with corresponding elements of the web content as rendered by the test browser engine. The operations further comprise generating a compatibility score for the web content based on differences from the comparison between the elements of the web content as rendered by the benchmark browser engine and the elements of the web content as rendered by the test browser engine. The operations further comprise receiving indication of one or more elements of the elements associated with the web content as rendered by the test browser engine to ignore, wherein the comparing and generating are not performed for the one or more ignored elements.

The disclosed subject matter further relates to a machine readable medium comprising instructions stored therein, which when executed by a system, cause the system to perform operations comprising receiving, from a benchmark browser engine, elements associated with a webpage as rendered by the benchmark browser engine. The operations further comprise receiving, from a test browser engine, elements associated with the webpage as rendered by the test browser engine. The operations further comprise comparing the elements of the webpage as rendered by the benchmark browser engine with corresponding elements of the webpage as rendered by the test browser engine. The operations further comprise generating a compatibility score for the webpage based on differences from the comparison between the elements of the webpage as rendered by the benchmark browser engine and the elements of the webpage as rendered by the test browser engine. The operations further comprise aggregating compatibility scores for each of a plurality of predetermined webpages as rendered by the test browser engine. The operations further comprise determining an overall compatibility score for the test browser engine based on an average of the compatibility scores for each of the plurality of predetermined webpages as rendered by the test browser engine.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive. It is to be understood that both the foregoing general description and the following detailed description are exemplary and explanatory and are intended to provide further explanation of the subject technology as claimed.

BRIEF DESCRIPTION OF THE DRAWINGS

Certain features of the subject technology are set forth in the appended claims. However, for purpose of explanation, several embodiments of the subject technology are set forth in the following figures.

FIG. 4 conceptually illustrates an electronic system with which some implementations of the subject technology are implemented.

DETAILED DESCRIPTION

Figure 1:
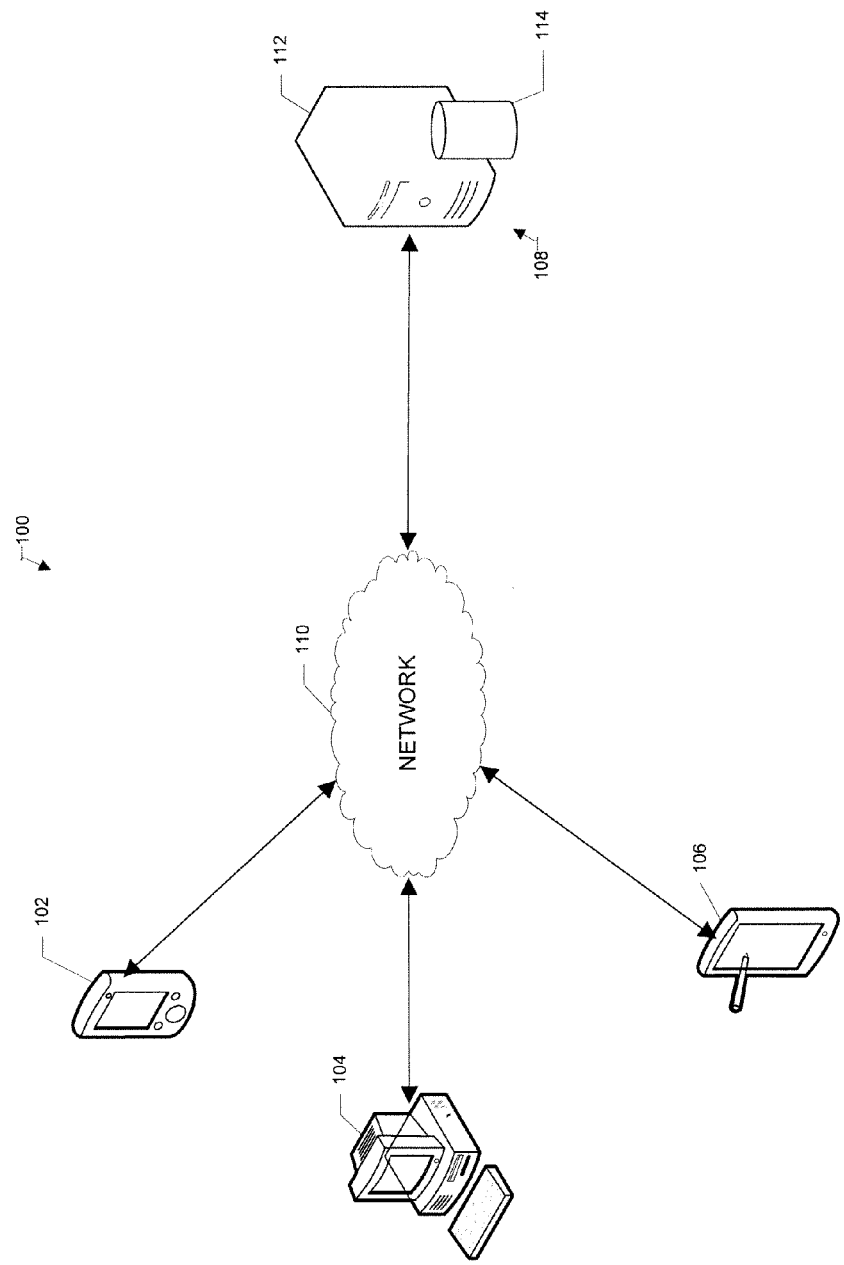
FIG. 1 illustrates an example network environment for generating a compatibility score for web content.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In accordance with subject technology, a system and a method for generating a compatibility score for web content is provided. In one example, web content corresponds to content of a webpage. The subject technology designates a type of browser engine (e.g., a browser engine for a type of web browsing application) as a benchmark browser engine and other types of browser engines as test browser engines. The term "benchmark browser engine" as used herein encompasses its plain and ordinary meaning, which includes, but is not limited to a type of browser engine that has been designated to render a layout of web content, which is used to compare with layouts rendered by test browser engines to determine compatibility scores of the test browser engines. Therefore, benchmark browser engine always has a perfect compatibility score. The term "benchmark browser engine" may refer to a specific software release of a type of browser engine. In this case, one software release version of a type of browser engine may be referred to as the "benchmark browser engine" and another software release version of the same type of browser engine may be referred to as a "test browser engine." The term "test browser engine" as used herein encompasses its plain and ordinary meaning, which includes, but is not limited to any type browser engine not including the benchmark browser engine that can renders a layout of the web content. The term "test browser engine" may also refer to a specific software release of a type of browser engine.

A layout of a web content (e.g., a webpage, etc.) as rendered by the benchmark browser engine is compared to the layout of the web content as rendered by a test browser engines. A compatibility score is calculated based on similarities or differences between the web content as rendered by the benchmark browser engine and the web content as rendered by the test browser engine. The compatibility score may be unique to a web content as rendered by the test browser engine. In one example, a different compatibility score is calculated based on similarities or difference between a different content as rendered by the benchmark browser engine and the different content as rendered by the test browser engine. The compatibility score for web content may vary among different types browser engines or different software releases of a particular type of browser engine that is used to render the web content. Furthermore, the compatibility score may also be an aggregate of compatibility scores for each of a plurality of predetermined web content as rendered by the test browser engine. In one example, the subject technology determines an overall compatibility score for the test browser engine based on an average of the compatibility scores for each of the plurality of predetermined web content as rendered by the test browser engine.

The subject technology requests the benchmark browser engine and a test browser engine to render a web content. The subject technology requests the benchmark browser engine and the test browser engine to identify elements associated with the web content as rendered by the respective browser engines. In one example aspect, both browser engines utilize layout engines to parse the web content into document object models. The term "layout engine" as used herein encompasses its plain and ordinary meaning, which includes, but is not limited to an application component that renders the layout of web content. The subject technology requests the benchmark browser engine and the test browser engine to identify elements (text based elements, link elements, image based elements, etc.) associated with each pixel of the rendered web content. For each pixel, the subject technology then compares the unique signature of the element that is associated with the respective pixel as rendered by the benchmark browser engine with the unique signature of the element that is associated with the corresponding pixel of the web content as rendered by the test browser engine to determine whether elements associated with the respective pixels are different.

The subject technology may elect to ignore certain content (e.g., advertisements, etc.) when comparing the rendered web content. In one example, the web content corresponding to a web page as rendered by the benchmark browser engine does not contain any advertisement content, whereas the web content corresponding to the webpage as rendered by the test browser engine contains advertisement content which is displayed on the top of the webpage and causes the remaining content to be shifted down by 20 pixels. In this case, the subject technology may shift web content corresponding to the webpage as rendered by the test browser engine upwards by 20 pixels to overlay the ignored content.

The subject technology generates a compatibility score based on differences between the web content as rendered by the benchmark browser engine and the test browser engine. One or more algorithms can be used to determine the compatibility score. In one example, the compatibility score is a ratio of the number of pixels for web content corresponding to a webpage as rendered by the two browser engines that are different to the number of total pixels for the web content corresponding to the webpage. In another example, the compatibility score is determined by first calculating a difference between the number of pixels for the web content corresponding to a webpage as rendered by the two browser engines that are different and the number of pixels that contain ignored content. Furthermore, a difference between the total number of pixels for the web content corresponding to the webpage and the number of pixels that contain ignored content is calculated. The compatibility score is based on the ratio of the first calculated difference to the second calculated difference.

FIG. 1 illustrates an example distributed network environment for generating a compatibility score for a web content. A network environment 100 includes a number of electronic devices 102, 104, and 106 communicably connected to a server 108 by a network 110. Server 108 includes a processing device 112 and a data store 114. Processing device 112 executes computer instructions stored in data store 114, for example, to generate a compatibility score.

In some example aspects, each of the electronic devices 102, 104, or 106 may include any machine that supports an application that provides an interface for displaying web content. Electronic devices 102, 104, and 106 can be mobile devices (e.g., smartphones, tablet computers, PDAs, and laptop computers), portable media players, desktop computers or other computing devices. In the example of FIG. 1, electronic device 102 is depicted as a smartphone, electronic device 104 is depicted as a laptop computer, and electronic device 106 is depicted as a tablet computer.

Server 108 may be any system or device having a processor, memory, and computational capability for determining a compatibility score for a webpage. Server 108 may be a single computing device such as a computer server. Server 108 may also represent more than one computing devices working together to perform the actions of a server computer.

Server 108 includes a processing device 112 and data store 114. Processing device 112 executes computer instructions stored in a computer-readable medium, for example, to compare web content. Data store 114, contains web data for elements that are associated with different web content.

In one example, server 108 receives from a benchmark browser engine that runs on electronic device 102, 104, or 106, elements associated with a web content as rendered by the benchmark browser engine. In one example the web content corresponds to content on a webpage. Server 108, also receives from a test browser engine that runs on the electronic device 102, 104, or 106, elements associated with the web content as rendered by the test browser engine. In another example, the benchmark browser engine and/or the test browser engine may run on server 108, wherein the webpage is rendered by server 108. Server 108 compares the elements of the web content as rendered by the benchmark browser engine with corresponding elements of the web content as rendered by the test browser engine. Server 108 then generates a compatibility score for the web content based on differences from the comparison between the elements of the web content as rendered by the benchmark browser engine and the elements of the web content as rendered by the test browser engine.

Network 110 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
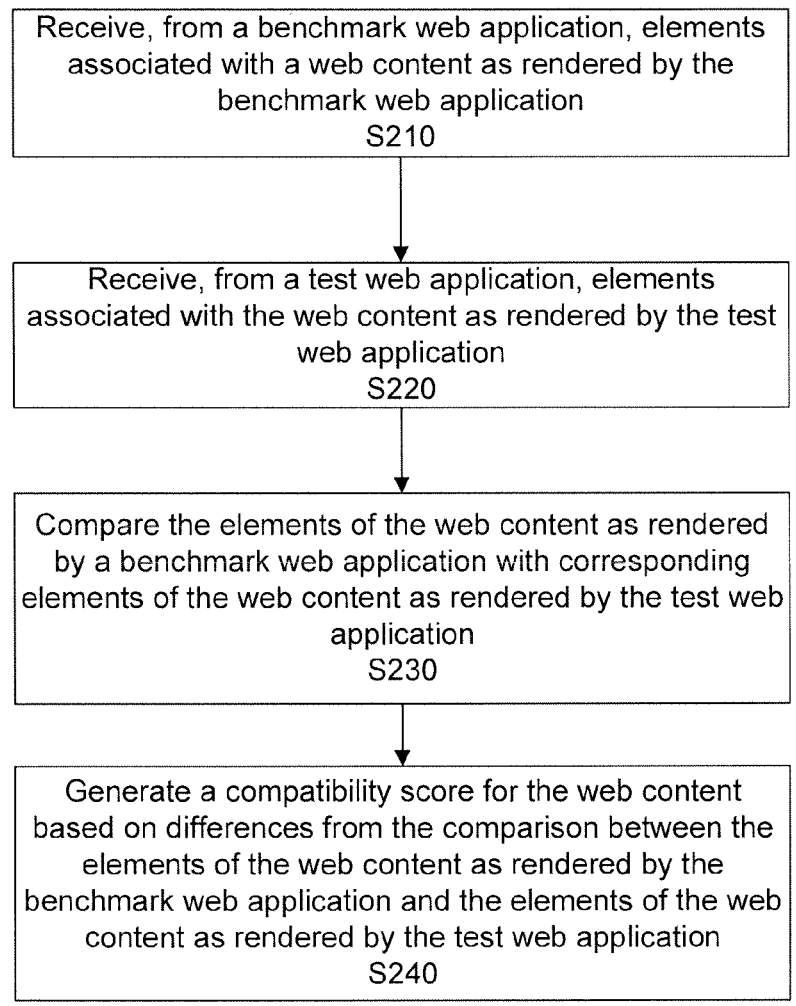
FIG. 2 illustrates an example process for generating a compatibility score for web content.

FIG. 2 illustrates an example process for generating a compatibility score for a web content. Although the operations in process 200 are shown in a particular order, certain operations may be performed in different orders or at the same time. In addition, although process 200 is described with reference to the system of FIG. 1, process 200 is not limited to such and can be performed by other system(s).

In block S210, server 108 receives, from a benchmark browser engine, elements that are associated with a web content as rendered by the benchmark browser engine. In one example, elements that are associated with the web content include various content provided by a webpage. In another example, the elements that are associated with the web content define the layout of the webpage. Each of the elements that are associated with the web content contains one or more pixels. In one example, the benchmark browser engine identifies a link that is associated with a pixel of an element as rendered by the benchmark browser engine for each pixel of the rendered web content. The benchmark browser engine then provides server 108 with the identified link for each pixel of the rendered web content.

The benchmark browser engine includes any browser engine that can provide an interface for displaying web content on electronic device 102, 104, or 106. The benchmark browser engine may run on any electronic device 102, 104, or 106. In this case, elements associated with the content are transmitted to server 108 after the web content has been rendered by the benchmark browser engine. Alternatively, server 108 may also run the benchmark browser engine to render the web content. In this case, elements associated with the web content as rendered by the benchmark browser engine is provided by server 108.

In block S220, server 108 receives, from a test browser engine, elements associated with the web content as rendered by the test browser engine. The test browser engine also includes any browser engine that can provide an interface for displaying web content on electronic device 102, 104, or 106. Similar to the benchmark browser engine, the test browser engine may run on electronic device 102, 104, or 106 or server 108. Furthermore, view size of the web content as rendered by the test browser engine is set to be identical to the view size of the web content as rendered by the benchmark browser engine. In one example, test browser engine identifies a link that is associated with a pixel of an element as rendered by the test browser engine for each pixel of the rendered web content. The test browser engine then provides server 108 with the identified link for each pixel of the rendered web content.

In block S230, server 108 compares the elements of the web content as rendered by the benchmark browser engine with the corresponding elements of the web content as rendered by the test browser engine. Server 108 may utilize a document object model comparison to compare each pixel of the elements of the web content as rendered by the test browser engine and the benchmark browser engine. In one example, server 108 compares each pixel of the elements of the web content as rendered by the test browser engine to a corresponding pixel of the elements of the web content as rendered by the benchmark browser engine. In particular, server 108, compares the link that is associated with a pixel of the web content as rendered by the test browser engine to the link that is associated with a corresponding pixel of the web content as rendered by the benchmark browser engine, for each pixel of the web content. In another example, if the elements of the web content define the layout of a webpage, a comparison of the layout of the web content as rendered by the benchmark browser engine and the web content as rendered by the test browser engine is made. In this case, server 108 compares each pixel of the elements of the web content as rendered by the test browser engine to a corresponding pixel of the elements of the web content as rendered by the benchmark browser engine.

Web content rendered by the benchmark browser engine and/or the test browser engine may contain injected elements such as advertisements which vary based on geographical location, user preferences, etc. For example, web content as rendered by the benchmark browser engine running on an electronic device located in Hawaii contains an injected advertisement for air travel to and from Hawaii, where web content as rendered by the test browser engine running on an electronic device located in San Francisco contains an injected advertisement for visiting the Golden Gate bridge.

A comparison of the web content as rendered by the benchmark browser engine and the test browser engine may take into account the injected elements. Alternatively, server 108 may designate the injected content as ignored content and compare the web content as rendered by the benchmark browser engine and the test browser engine without taking the ignored content into consideration. Ignored content may include injected advertisements. In one example, server 108 uses an advertisement filtering application to identify domains and/or uniform resource locators that contain injected advertisements. Ignored content may also include elements that are not provided by the entity that is associated with the web content. In one example, server 108 may determine that a video content that is displayed on johndoe.com originates from janedoe.com and identify the video content as ignored content. In another example, server 108 accesses log data that contains a list of uniform resource locators and/or domains that have been identified to contain ignored content. In this case, injected content that originate from a domain or is associated with a uniform resource locator that is listed in the log data are designated as ignored content.

Server 108 may determine the relative location of the ignored element with respect to other elements of the rendered web content and the size of the ignored element as it is rendered by the benchmark browser engine and/or the test browser engine. Server 108 can simulate a shift of elements as rendered by the test browser engine to overlap the area corresponding to the ignored element. As shown in illustration 360, server 108 may shift elements that are below the ignored content 366 to overlay the ignored content 364. In a case where server 108 simulates a shift of elements as rendered by the test browser engine to overlay ignored content, the compatibility score for the web content is based on a ratio of a number of pixels of the elements of the web content as simulated by the test browser engine that is different from corresponding pixels of the elements of the web content as rendered by the benchmark browser engine to a total number of pixels of the elements of the web content as rendered by the benchmark browser engine.

In block S240, server 108 generates a compatibility score for the web content based on differences from the comparison between the elements of the web content as rendered by the benchmark browser engine and the elements of the web content as rendered by the test browser engine. In one example, the compatibility score has a range 0-1. In another example, the compatibility score has a range of 0-100. Server 108 may receive an indication of one or more elements of the elements associated with the web content as rendered by the test browser engine to ignore.

Where ignored elements are not accounted for, the compatibility score may be a ratio of the number of pixels of the web content as rendered by the test browser engine that is different from corresponding pixels of the web content as rendered by the benchmark browser engine to a total number of pixels of the web content as rendered by the benchmark browser engine. In another example, the ignored elements are accounted for, and the comparing and generating are not performed for the ignored elements. Where ignored elements are accounted for, the compatibility score may be a ratio of a number of pixels of the web content as rendered by the test browser engine that is different from corresponding pixels of the web content as rendered by the benchmark browser engine subtracted by the number of pixels of the ignored element to a total number of pixels of the web content as rendered by the test browser engine subtracted by the number of pixels of the ignored element. Where server 108 simulates a shift of elements to overlay the ignored element, the compatibility score for the web content is based on a ratio of a number of pixels of the elements of the web content as simulated by the test browser engine that is different from corresponding pixels of the elements of the web content as rendered by the benchmark browser engine to a total number of pixels of the elements of the web content as rendered by the benchmark browser engine.

An overall compatibility score may be generated for each test browser engine. In one example, the overall compatibility score is an average of the compatibility scores for top ranked (e.g., by popularity, by visits/day visits per lifetime, etc.) webpages as rendered by the test browser engine. In another example, the overall compatibility score is a weighted average of the compatibility scores for the top ranked webpages as rendered by the test browser engine, where compatibility scores for webpages that are popular are given more weight.

Figure 3A:
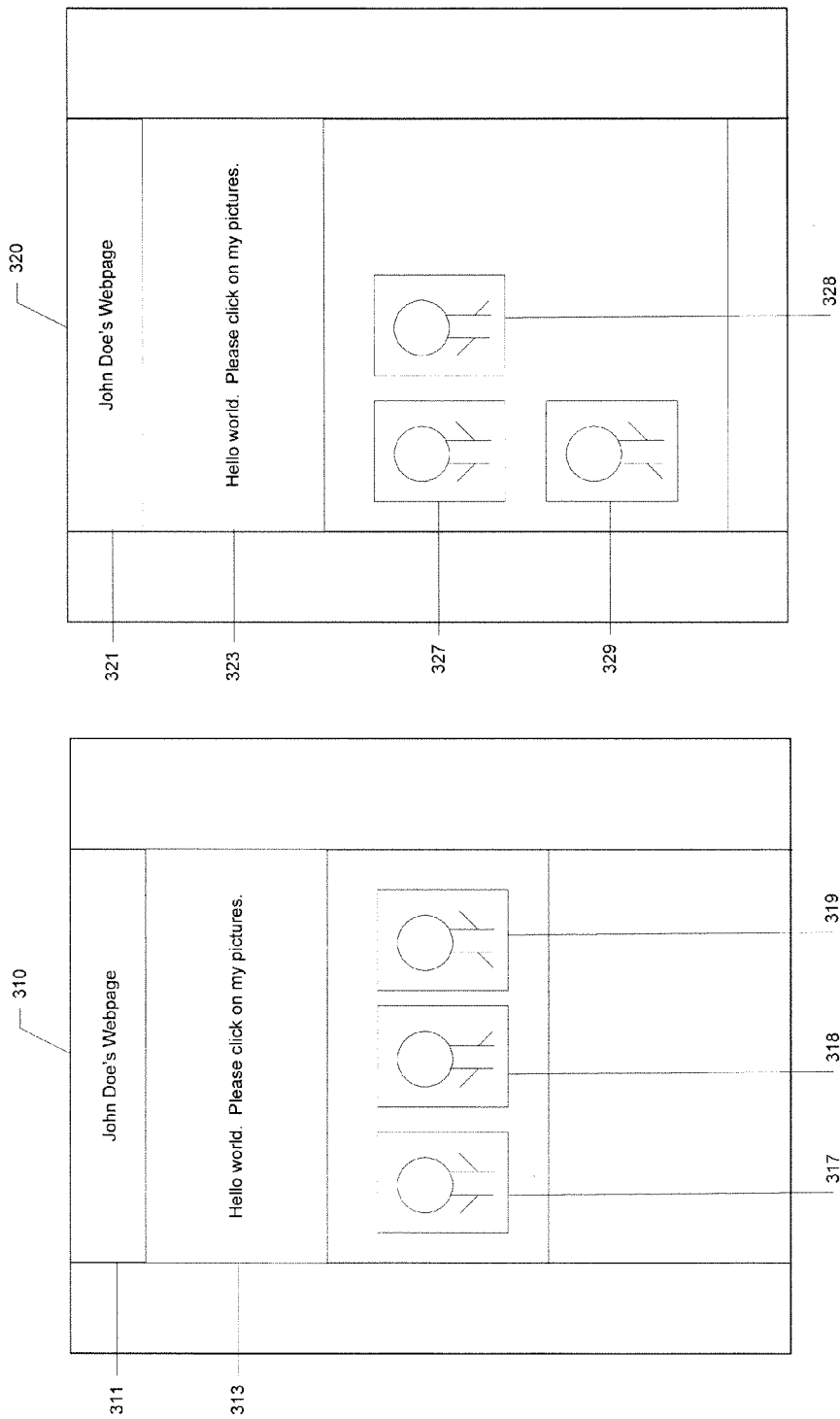
FIG. 3A is an illustration of a comparison between a webpage as rendered by a benchmark browser engine and the webpage as rendered by a test browser engine.

FIG. 3A is an illustration of a comparison between a webpage as rendered by a benchmark browser engine and a webpage as rendered by a test browser engine. Illustration 310 is an illustration of a webpage as rendered by a benchmark browser engine, which contains text-based content 311 and 313 and images 317-319. Illustration 320 is an illustration of the same webpage as rendered by a test browser engine. Illustration 320 contains text based content 321 and 323 which correspond to text-based content 311 and 313. Illustration 320 also contains images 327-329, which correspond to images 317-319 as rendered by the benchmark browser engine. Image 329 of the webpage as rendered by the test browser engine is shifted compared to image 319 of the webpage as rendered by the benchmark browser engine.

In one example, server 108 first calculates the total number of pixels the webpage contains. Server 108 then compares each pixel of the webpage as rendered by the test browser engine with a corresponding pixel of the webpage as rendered by the benchmark browser engine. In this case, pixels rendered by the test browser engine that are different from corresponding pixels rendered by the benchmark browser engine include pixels that are associated with image 319 as rendered by the benchmark browser engine and pixels that are associated with image 329 as rendered by the test browser engine.

Figure 3B:
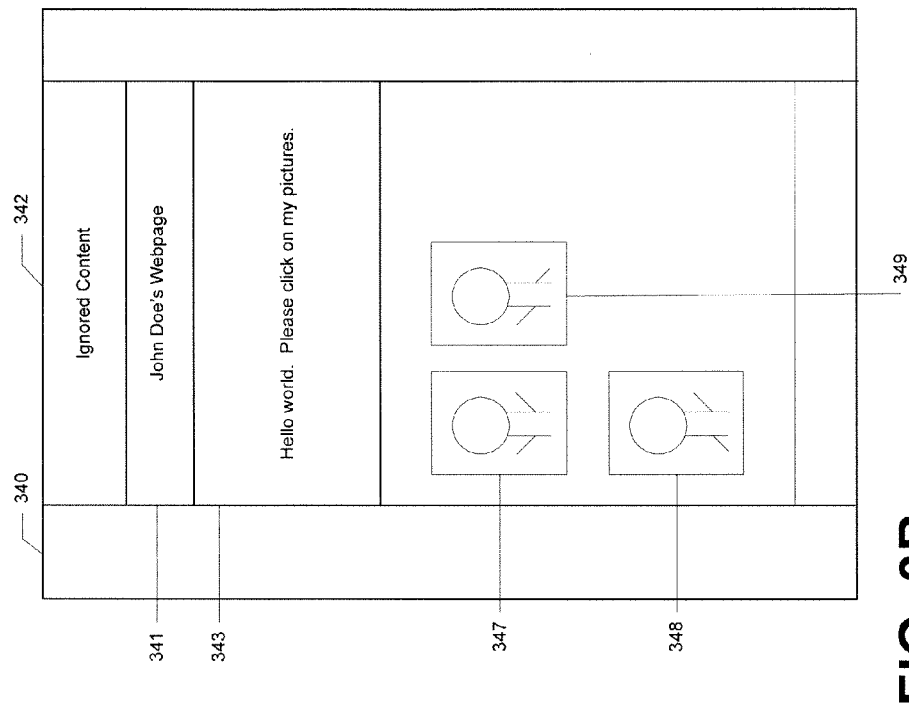
FIG. 3B is another illustration of a comparison between a webpage as rendered by a benchmark browser engine and the webpage as rendered by a test browser engine.
Figure 3B:
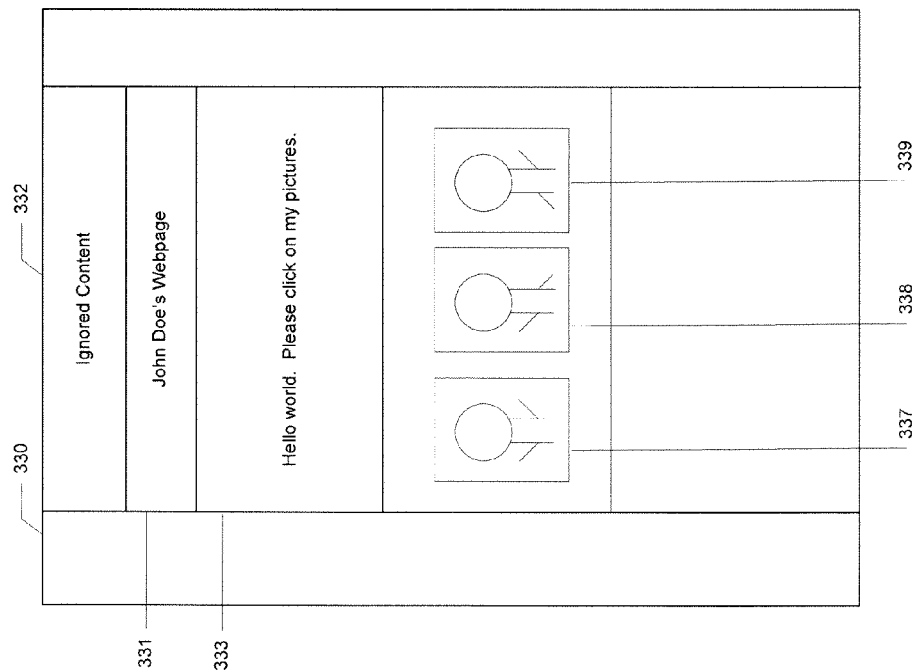

FIG. 3B is another illustration of a comparison between a webpage as rendered by a benchmark browser engine and a webpage as rendered by a test browser engine. Illustration 330 is an illustration of a webpage as rendered by a benchmark browser engine, which contains text-based content 331 and 333 and images 337-339. Illustration 340 is an illustration of the same webpage as rendered by a test browser engine. Illustration 340 contains text based content 341 and 343 which correspond to text-based content 331 and 333. Illustration 340 also contains images 347-349, which correspond to images 337-339 as rendered by the benchmark browser engine. Image 349 of the webpage as rendered by the test browser engine is shifted compared to image 339 of the webpage as rendered by the benchmark browser engine. Furthermore, the webpage as rendered by the benchmark browser engine and the webpage as rendered by the test browser engine both contain ignored content (e.g., advertisements, etc.), which is rendered at the top of the webpage.

Server 108 may first calculate the total number of pixels the webpage contains. Server 108 may then compares each pixel of the webpage as rendered by the test browser engine with a corresponding pixel of the webpage as rendered by the benchmark browser engine. Server 108 may also determine if the webpage as rendered by the benchmark browser engine and/ or the test browser engine contains ignored content. In one example, server 108 considers advertisement content that are injected onto the webpage as ignored content. In this case, server 108 may determine if any pixel of the webpage as rendered by the test browser engine and/or the benchmark browser engine is associated with advertisement content. Server 108, upon determining that the webpage contains ignored content 332 and 342, determines the size of the ignored content and the position of the ignored content. Server 108 then determines the total number of pixels the webpage as rendered by the test browser engine and the webpage as rendered by the benchmark browser engine contains respectively. In this case, the compatibility score of the webpage as rendered by the test browser engine is only based on comparison of pixels that do not contain ignored content.

Figure 3C:
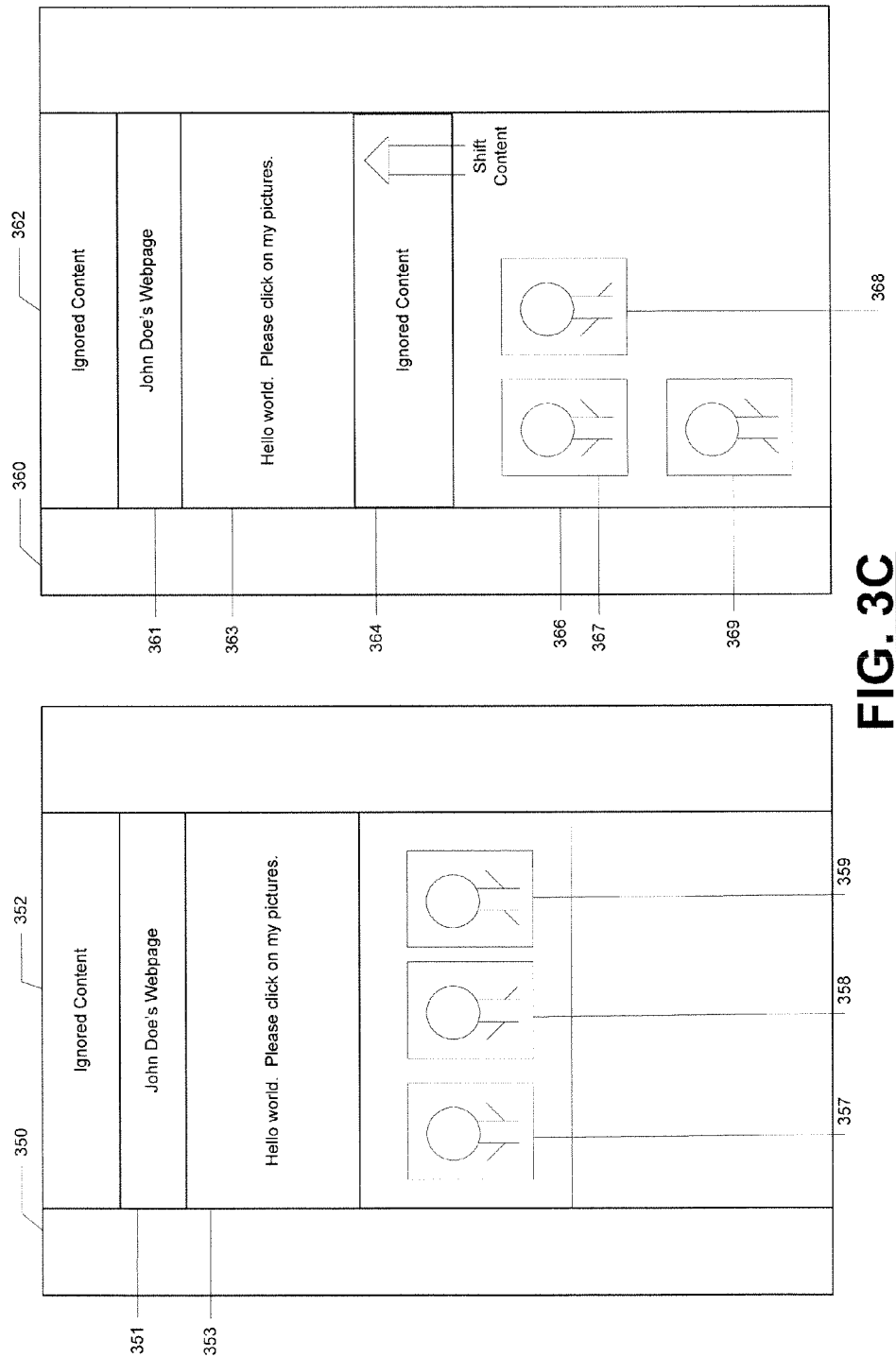
FIG. 3C is another illustration of a comparison between a webpage as rendered by a benchmark browser engine and the webpage as rendered by a test browser engine.

FIG. 3C is another illustration of a comparison between a webpage as rendered by a benchmark browser engine and a webpage as rendered by a test browser engine. Illustration 350 is an illustration of a webpage as rendered by a benchmark browser engine, which contains text-based content 351 and 353 and images 357-359. Illustration 360 is an illustration of the same webpage as rendered by a test browser engine. Illustration 360 contains text based content 361 and 363 which correspond to text-based content 351 and 353. Illustration 360 also contains images 367-369, which correspond to images 357-359 as rendered by the benchmark browser engine. Image 369 of the webpage as rendered by the test browser engine is shifted compared to image 359 of the webpage as rendered by the benchmark browser engine. Both the webpage as rendered by the benchmark browser engine and the webpage as rendered by the test browser engine contain ignored content (e.g., advertisements, etc.) 352 and 362, which are rendered at the top of the webpage.

Server 108, upon determining that the webpage contains ignored content, determines the size of the ignored content and the position of the ignored content. In this case, the compatibility score of the webpage as rendered by the test browser engine is only based on comparison of pixels that do not contain ignored content. As shown in illustration 360, the webpage as rendered by the test browser engine also contains ignored content 364, which is not present in illustration 350, which is an illustration of the webpage as rendered by the benchmark browser engine. In one example, server 108 simulates a shift of elements as rendered by the test browser engine to overlap the area corresponding to the ignored element. As shown in illustration 360, server 108 may shift elements that are below the ignored content 366 to overlay the ignored content 364. In a case where server 108 simulates a shift of elements as rendered by the test browser engine to overlay ignored content, the compatibility score for the web content is based on a ratio of a number of pixels of the elements of the web content as simulated by the test browser engine that is different from corresponding pixels of the elements of the web content as rendered by the benchmark browser engine to a total number of pixels of the elements of the web content as rendered by the benchmark browser engine.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

FIG. 4 conceptually illustrates an electronic system with which some implementations of the subject technology are implemented. Electronic system 400 can be a laptop computer, a desktop computer, smartphone, PDA, a tablet computer or any other sort of device 102, 104, and 106. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's electronic device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to an electronic device (e.g., for purposes of displaying data to and receiving user input from a user interacting with the electronic device). Data generated at the electronic device (e.g., a result of the user interaction) can be received from the electronic device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for generating a compatibility score for web content, the method comprising:
    receiving, from a benchmark browser engine, elements associated with web content as rendered by the benchmark browser engine, wherein the benchmark browser engine sets a standard rendering of the elements associated with the web content;
    receiving, from a test browser engine that is different than the benchmark browser engine, elements associated with the web content as rendered by the test browser engine;
    comparing the elements of the web content as rendered by the benchmark browser engine with corresponding elements of the web content as rendered by the test browser engine;
    generating a compatibility score for the web content based on differences from the comparison between the elements of the web content as rendered by the benchmark browser engine and the elements of the web content as rendered by the test browser engine;
    receiving indication of one or more elements of the elements associated with the web content as rendered by the test browser engine to ignore,
    wherein generating the compatibility score comprises ignoring the indicated one or more elements with respect to the differences from the comparison between the elements of the web content as rendered by the benchmark browser engine and the elements of the web content as rendered by the test browser engine;
    aggregating compatibility scores for each of a plurality of predetermined web content as rendered by the test browser engine; and
    determining an overall compatibility score for the test browser engine based on an average of the compatibility scores for each of the plurality of predetermined web content as rendered by the test browser engine.

2. The computer-implemented method of claim 1, wherein the web content corresponds to content of a webpage.

3. The computer-implemented method of claim 1, wherein the comparing comprises comparing each pixel of the elements of the web content as rendered by the test browser engine with a corresponding pixel of the elements of the web content as rendered by the benchmark browser engine.

4. The computer-implemented method of claim 3, wherein a document object model comparison is used to compare each pixel of the elements of the web content as rendered by the test browser engine and the benchmark browser engine.

5. The computer-implemented method of claim 1, wherein the compatibility score is a ratio of a number of pixels the elements of the web content as rendered by the test browser engine that is different from corresponding pixels of the elements of the web content as rendered by the benchmark browser engine to a total number of pixels the elements of the web content as rendered by the test browser engine.

6. The computer-implemented method of claim 1, wherein the indicated one or more elements correspond to advertisement content.

7. The computer-implemented method of claim 1, wherein in ignoring the indicated one or more elements, the generating comprises:
    determining a ratio of a number of pixels of the elements of the web content as rendered by the test browser engine that is different from corresponding pixels of the elements of the web content as rendered by the benchmark browser engine, subtracted by the number of pixels of the indicated one or more elements, to a total number of pixels of the elements of the web content as rendered by the test browser engine subtracted by the number of pixels of the indicated one or more elements.

8. The computer-implemented method of claim 1, wherein in ignoring the indicated one or more elements, the generating comprises:
    determining an area of the web content as rendered by the test browser engine comprises the indicated one or more elements;
    simulating a shift of the elements as rendered by the test browser engine to overlap the area comprising the indicated one or more elements,
    wherein the compatibility score for the web content is based on a ratio of a number of pixels of the elements of the web content as simulated by the test browser engine that is different from corresponding pixels of the elements of the web content as rendered by the benchmark browser engine to a total number of pixels of the elements of the web content as rendered by the benchmark browser engine.

9. The computer-implemented method of claim 1, wherein the test browser engine is a component of a web browsing application.

10. A system for generating a compatibility score for web content, the system comprising:
    one or more processors, and
    a machine readable medium comprising instructions stored therein, which when executed by the processors, cause the processors to perform operations comprising:
        receiving, from a benchmark browser engine, elements associated with a web content as rendered by the benchmark browser engine, wherein the benchmark browser engine sets a standard rendering of the elements associated with the web content;
        receiving, from a test browser engine that is different than the benchmark browser engine, elements associated with the web content as rendered by the test browser engine;

comparing the elements of the web content as rendered by the benchmark browser engine with corresponding elements of the web content as rendered by the test browser engine;
generating a compatibility score for the web content based on differences from the comparison between the elements of the web content as rendered by the benchmark browser engine and the elements of the web content as rendered by the test browser engine;
receiving indication of one or more elements of the elements associated with the web content as rendered by the test browser engine to ignore,
wherein generating the compatibility score comprises ignoring the indicated one or more elements with respect to the differences from the comparison between the elements of the web content as rendered by the benchmark browser engine and the elements of the web content as rendered by the test browser engine;
aggregating compatibility scores for each of a plurality of predetermined web content as rendered by the test browser engine; and
determining an overall compatibility score for the test browser engine based on an average of the compatibility scores for each of the plurality of predetermined web content as rendered by the test browser engine.

11. The system of claim 10, wherein the comparing comprises comparing each pixel of the elements of the web content as rendered by the test browser engine with a corresponding pixel of the elements of the web content as rendered by the benchmark browser engine.

12. The system of claim 11, wherein a document object model comparison is used to compare each pixel of the elements of the web content as rendered by the test browser engine and the benchmark browser engine.

13. The system of claim 10, wherein the compatibility score is a ratio of a number of pixels the elements of the web content as rendered by the test browser engine that is different from corresponding pixels of the elements of the web content as rendered by the benchmark browser engine to a total number of pixels the elements of the web content as rendered by the test browser engine.

14. The system of claim 10, wherein the indicated one or more elements correspond to advertisement content.

15. The system of claim 10, wherein in ignoring the indicated one or more elements, the generating comprises:
determining a ratio of a number of pixels of the elements of the web content as rendered by the test browser engine that is different from corresponding pixels of the elements of the web content as rendered by the benchmark browser engine, subtracted by the number of pixels of the indicated one or more elements, to a total number of pixels of the elements of the web content as rendered by the test browser engine subtracted by the number of pixels of the indicated one or more elements.

16. The system of claim 10, wherein in ignoring the indicated one or more elements, the generating comprises:
determining an area of the web content as rendered by the test browser engine comprises the indicated one or more elements;
simulating a shift of the elements as rendered by the test browser engine to overlap the area comprising the indicated one or more elements,
wherein the compatibility score for the web content is based on a ratio of a number of pixels of the elements of the web content as simulated by the test browser engine that is different from corresponding pixels of the elements of the web content as rendered by the benchmark browser engine to a total number of pixels of the elements of the web content as rendered by the benchmark browser engine.

17. A machine-readable medium comprising instructions stored therein, which when executed by a processor, cause the processor to perform operations comprising:
receiving, from a benchmark browser engine, elements associated with a webpage as rendered by the benchmark browser engine, wherein the benchmark browser engine sets a standard rendering of the elements associated with the web content;
receiving, from a test browser engine that is different than the benchmark browser engine, elements associated with the webpage as rendered by the test browser engine;
comparing the elements of the webpage as rendered by the benchmark browser engine with corresponding elements of the webpage as rendered by the test browser engine;
generating a compatibility score for the webpage based on differences from the comparison between the elements of the webpage as rendered by the benchmark browser engine and the elements of the webpage as rendered by the test browser engine;
receiving indication of one or more elements of the elements associated with the web content as rendered by the test browser engine to ignore,
wherein generating the compatibility score comprises ignoring the indicated one or more elements with respect to the differences from the comparison between the elements of the web content as rendered by the benchmark browser engine and the elements of the web content as rendered by the test browser engine;
aggregating compatibility scores for each of a plurality of predetermined webpages as rendered by the test browser engine; and
determining an overall compatibility score for the test browser engine based on an average of the compatibility scores for each of the plurality of predetermined webpages as rendered by the test browser engine.

18. The machine-readable medium of claim 17, wherein the comparing comprises comparing each pixel of the elements of the webpage as rendered by the test browser engine with a corresponding pixel of the elements of the webpage as rendered by the benchmark browser engine.

19. The machine-readable medium of claim 18, wherein a document object model comparison is used to compare each pixel of the elements of the webpage as rendered by the test browser engine and the benchmark browser engine.

20. A computer-implemented method for generating a compatibility score for web content, the method comprising:
receiving, from a benchmark browser engine, elements associated with web content as rendered by the benchmark browser engine;
receiving, from a test browser engine, elements associated with the web content as rendered by the test browser engine;
comparing the elements of the web content as rendered by the benchmark browser engine with corresponding elements of the web content as rendered by the test browser engine;
generating a compatibility score for the web content based on differences from the comparison between the elements of the web content as rendered by the benchmark browser engine and the elements of the web content as rendered by the test browser engine; and receiving indication of one or more elements of the elements associated with the web content as rendered by the test browser engine to ignore, wherein the comparing and generating are not performed for the one or more ignored elements, and wherein the compatibility score is a ratio of a number of pixels of the elements of the web content as rendered by the test browser engine that is different from corresponding pixels of the elements of the web content as rendered by the benchmark browser engine, subtracted by the number of pixels of the one or more ignored elements, to a total number of pixels of the elements of the web content as rendered by the test browser engine subtracted by the number of pixels of the one or more ignored elements.

21. A computer-implemented method for generating a compatibility score for web content, the method comprising:

receiving, from a benchmark browser engine, elements associated with web content as rendered by the benchmark browser engine;

receiving, from a test browser engine, elements associated with the web content as rendered by the test browser engine;

comparing the elements of the web content as rendered by the benchmark browser engine with corresponding elements of the web content as rendered by the test browser engine;

generating a compatibility score for the web content based on differences from the comparison between the elements of the web content as rendered by the benchmark browser engine and the elements of the web content as rendered by the test browser engine;

receiving indication of one or more elements of the elements associated with the web content as rendered by the test browser engine to ignore, wherein the comparing and generating are not performed for the one or more ignored elements;

determining an area of the web content as rendered by the test browser engine comprises the one or more ignored elements; and simulating a shift of the elements as rendered by the test browser engine to overlap the area comprising the one or more ignored elements, wherein the compatibility score for the web content is based on a ratio of a number of pixels of the elements of the web content as simulated by the test browser engine that is different from corresponding pixels of the elements of the web content as rendered by the benchmark browser engine to a total number of pixels of the elements of the web content as rendered by the benchmark browser engine.

\* \* \* \* \*